United States Patent [19]

Harper

[11] 4,107,749
[45] Aug. 15, 1978

[54] CASSETTE RECORD PLAYER-RECORDER

[75] Inventor: Kenneth B. Harper, Winnetka, Ill.

[73] Assignee: Motorola, Inc., Schaumburg, Ill.

[21] Appl. No.: 39,500

[22] Filed: May 21, 1970

[51] Int. Cl.² .................... G11B 5/54; G11B 21/22
[52] U.S. Cl. .................................. 360/105; 242/201
[58] Field of Search ................. 179/100.2 Z, 100.11, 179/100.1 A; 242/55.19 A, 197, 71; 274/4 B, 4 C, 4 D, 4 F

[56] References Cited

U.S. PATENT DOCUMENTS

| | | | |
|---|---|---|---|
| 2,912,179 | 11/1959 | Schuyler | 179/100.2 Z |
| 2,914,620 | 11/1959 | Dale | 179/100.2 Z |
| 3,265,817 | 8/1966 | Gilman | 179/100.2 Z |
| 3,322,906 | 5/1967 | Rothman | 179/100.2 Z |
| 3,417,938 | 12/1968 | Markakis et al. | 179/100.2 Z |
| 3,484,110 | 12/1969 | Takemi et al. | 179/100.2 Z |
| 3,521,010 | 7/1970 | Sato | 179/100.2 Z |

*Primary Examiner*—Leonard D. Christian
*Attorney, Agent, or Firm*—James W. Gillman

[57] ABSTRACT

A converter cartridge for reception and operation of a cassette record and insertion into a host cartridge player. The converter cartridge carries drive means for transporting the tape within the cassette; cam means for advancing and withdrawing tape heads and a pinch roller toward and away from the cassette in response to insertion and withdrawal of the converter cartridge; push buttons and associated linkage and drive elements effective to advance and reverse the tape within the cassette and to reinstate the playing or recording mode upon release of the appropriate push button; each of said buttons serving to lock the other when desired, the converter cartridge being capable of independent operation when fitted with power means.

12 Claims, 21 Drawing Figures

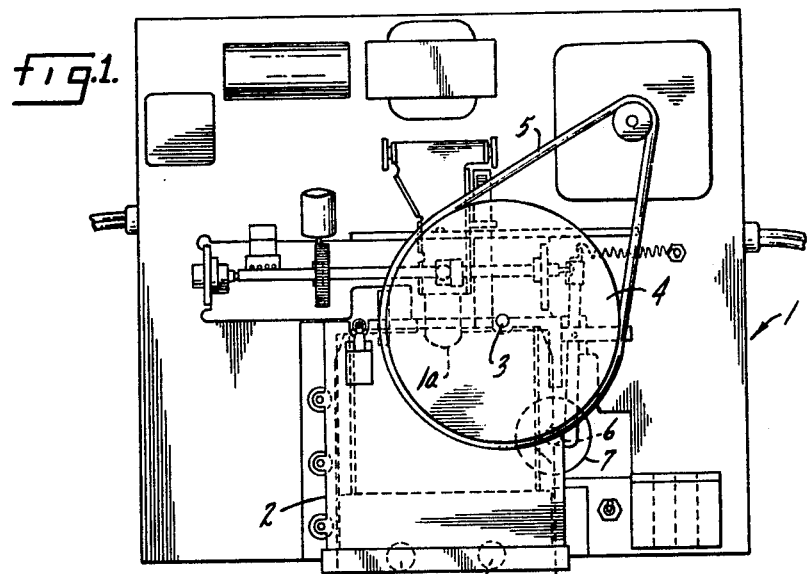
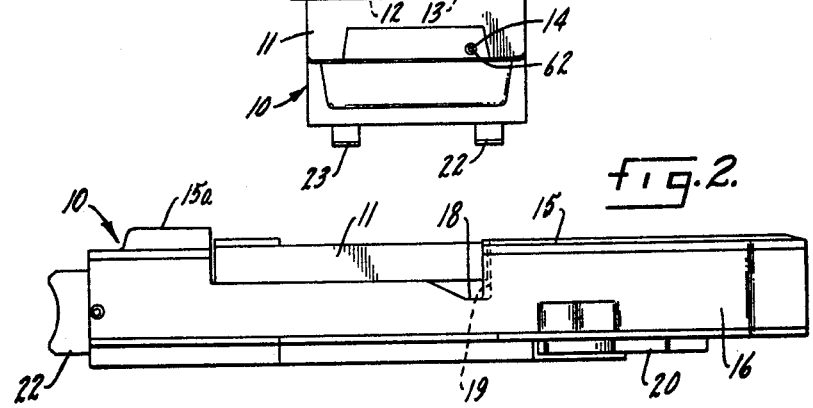
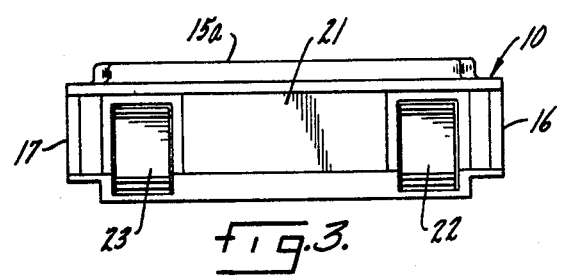

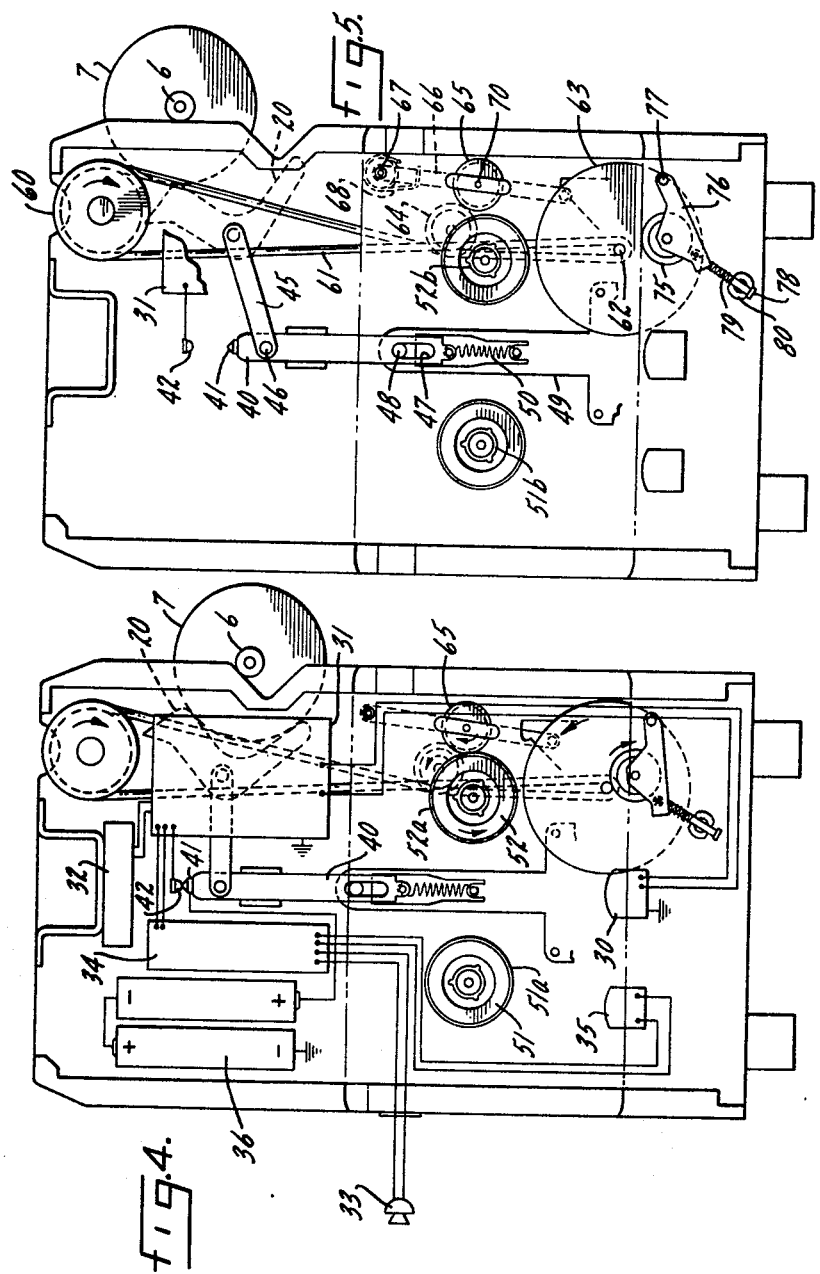

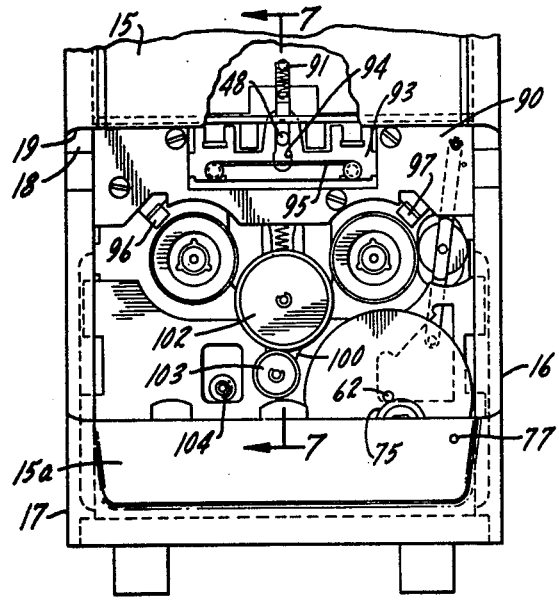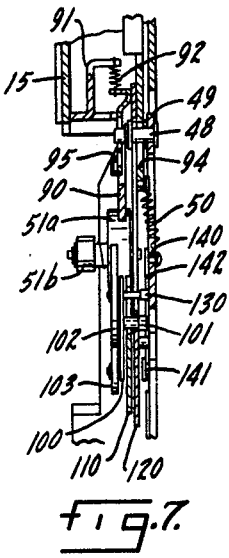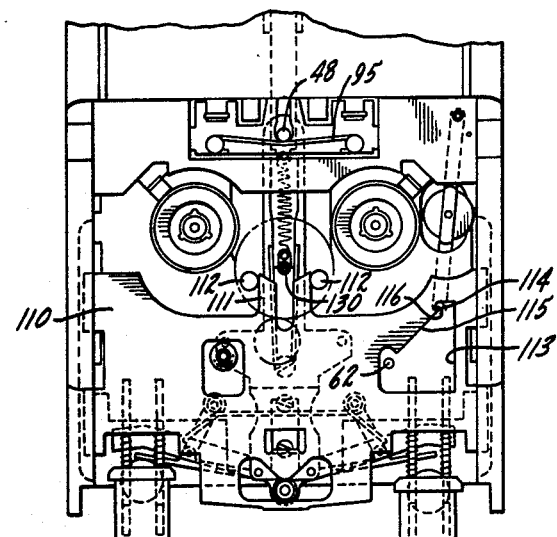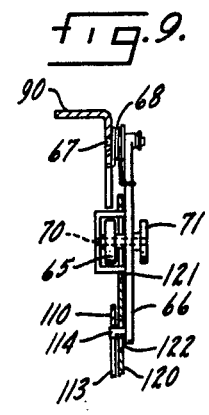

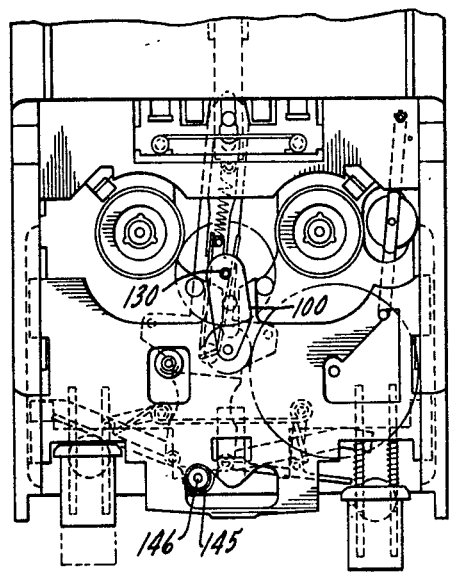
fig.10.
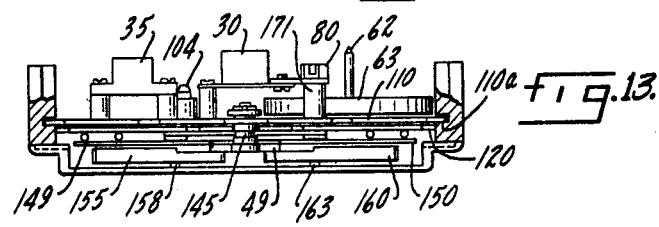
fig.13.
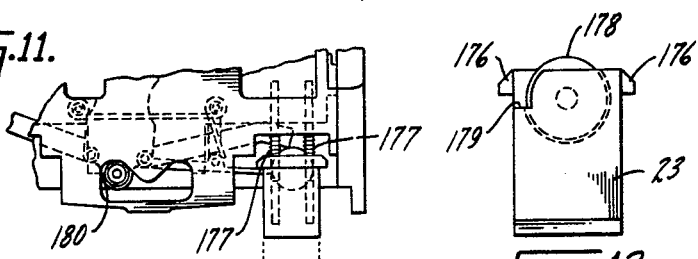
fig.11.
fig.12.

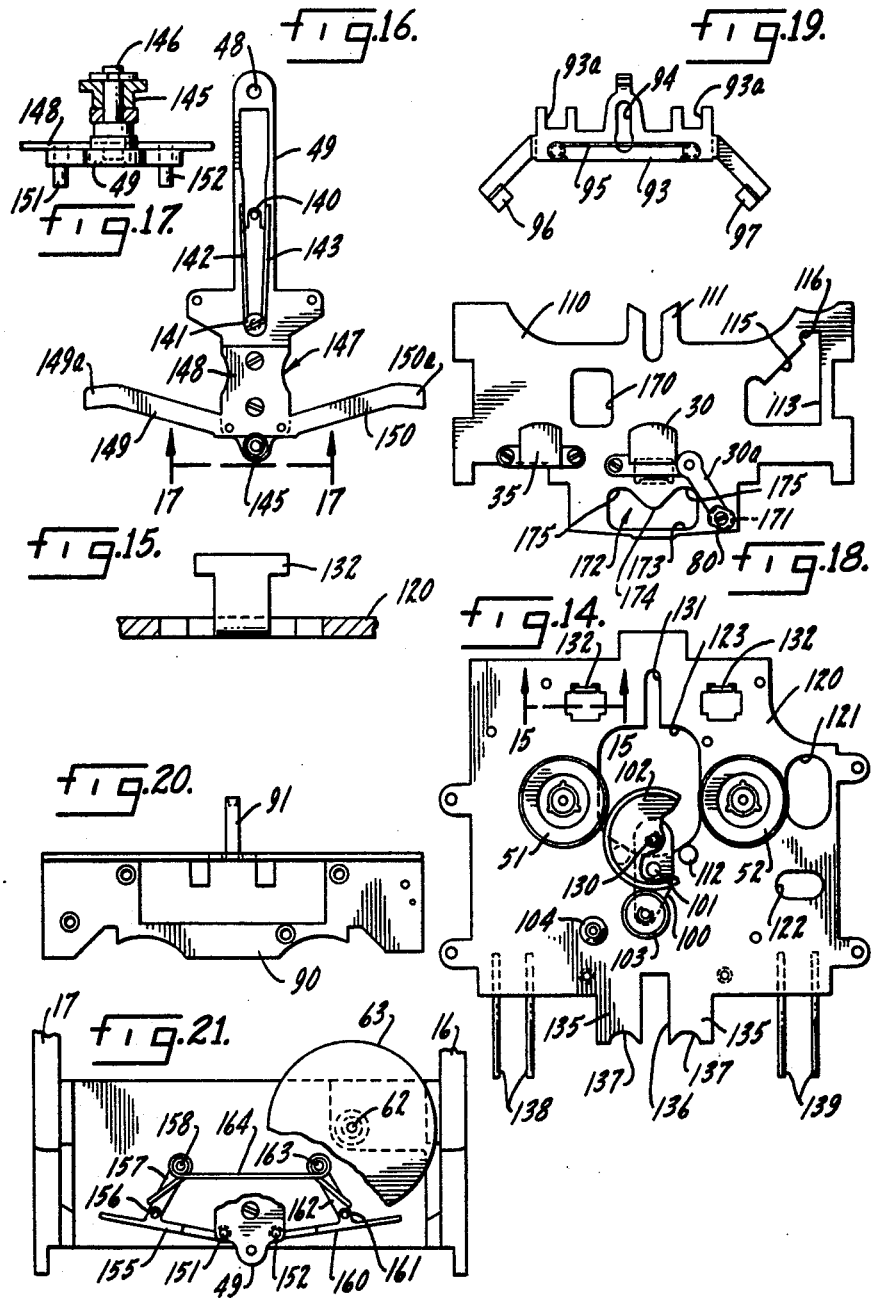

CASSETTE RECORD PLAYER-RECORDER

SUMMARY OF THE INVENTION

A converter cartridge receives a cassette containing a tape record having a tape supply reel and a take-up reel therein; the converter cartridge carries drive means for transporting the tape within the cassette, player and eraser heads and electrical elements for erasing, recording upon or playing the tape within the cassette; cam and link elements are provided for automatic advancement of a pinch roller and player head in response to insertion of the converter cartridge in a host record player. The converter cartridge is fitted for both playing from and recording on the tape within a cassette. Manually operable controls include a set of push buttons and appropriate linkage and camming elements operable thereby to produce a sequence of events as a result of a single, continuous linear movement of each button; one button is moved inwardly to lock the supply and take-up reels, to withdraw the player head and pinch roller, release the lock and produce a rapid advancement of the tape, the release of said button resulting in immediate application and release of the lock and immediate return of the device to the playing or recording mode; similarly the second button produces a corresponding set of functions to reverse the tape and return it to the playing or recording mode upon release; means are provided whereby each button may be pressed inwardly to lock the other button in its innermost, operative position, a pressing of said other button being effective to release the locking button from locking position. The converter cartridge can be provided with internal power mechanisms for remote, independent operation when removed from a host record player.

The invention relates to the field of tape records and has particular relation to a means for playing or recording upon the tape record within a cassette.

The cassette is a well-known, relatively small, thin, self-contained cartridge having therein a set of spaced reels with a tape record wound thereon, portions of the tape record being exposed through an edge of the cassette cartridge for presentation to a player or recording head, an eraser head and a pinch roller. Apertures are provided for reception of reel-driving gears and a capstan. Tape record players adapted to receive and play eight-track and four-track tape record cartridges are incapable of receiving and playing from a cassette. Accordingly, it is one purpose of the invention to provide a means for playing from or recording upon a tape within a cassette by means of a host record player of the type designed for reception of an eight-track cartridge.

Another purpose is to provide a converter cartridge receivable in an eight-track cartridge type record player and capable of playing or recording upon the tape within a cassette.

Another purpose is to provide a converter cartridge having means for transporting and controlling the tape of a cassette in response to operation of an eight-track cartridge type record player.

Another purpose is to provide a converter cartridge capable of transporting and controlling the tape in a cassette in response to insertion of the converter cartridge in an eight-track cartridge type record player.

Another purpose is to provide a converter cartridge having means responsive to insertion into and withdrawal from an eight-track cartridge type record player and effective to automatically position drive elements, brakes, eraser and player-recorder heads and a pinch roller within said converter cartridge.

Another purpose is to provide a control means effective in response to a single linear movement to transition the elements of the cartridge from the playing-recording mode through the stopped condition to a rapid advance mode.

Another purpose is to provide a control means responsive to a single linear movement thereof and effective to transition elements associated therewith from the playing-recording mode through the stopped condition to the rapid reverse mode.

Another purpose is to provide a control means responsive to release thereof to transition elements associated therewith from the rapid forward mode through the stopped condition to a substantially immediate return to the playing-recording mode.

Another purpose is to provide a control means responsive to release thereof to transition elements associated therewith from the rapid reverse mode through the stopped condition to a substantially immediate return to the playing-recording mode.

Another purpose is to provide control means effective to produce a smooth, fast transition of the elements associated therewith from the playing-recording to the advance or reverse mode and back to the playing-recording mode.

Another purpose is to provide control means effective to produce a rapid advance or reverse of the tape in a cassette, the control means productive of said advance being employable to lock the control means productive of said reverse, the control means productive of said reverse being employable to lock the control means productive of said advance.

Another purpose is to provide a control means for transitioning the elements associated therewith from the playing-recording mode to the advance or reverse mode, the control means including locking means releasable upon additional actuation of the control means.

Another purpose is to provide a converter cartridge having control means effective to transition elements associated therewith from the playing-recording mode to the advance or reverse mode and means releasing said control means in response to withdrawal of the converter cartridge from a host record player structure.

Another purpose is to provide a converter cartridge including braking and locking elements automatically effective upon withdrawal of the converter cartridge from the record player structure.

Another purpose is to provide a cassette player-recording of maximum economy, compactness and simplicity.

Other purposes will appear from time to time during the course of the specification and claims.

BRIEF DESCRIPTION OF THE DRAWINGS

The invention is illustrated more or less diagrammatically in the accompanying drawings wherein:

FIG. 1 is a top plan view;

FIG. 2 is a side view on an enlarged scale of a converter cartridge in accordance with the invention;

FIG. 3 is a front plan view of the structure of FIG. 2;

FIG. 4 is a top view with parts removed for clarity;

FIG. 5 is a view similar to that of FIG. 4 illustrating parts in another position;

FIG. 6 is a top view illustrating additional parts;

FIG. 7 is a view taken on the line 7—7 of FIG. 6;

FIG. 8 is a view similar to that of FIG. 6 illustrating additional parts and with parts in another position;

FIG. 9 is a side view in partial cross section illustrating a portion of FIG. 8;

FIG. 10 is a view similar to that of FIG. 8 with additional parts shown and with parts in another position;

FIG. 11 is a detail view of a part of FIG. 10 illustrated in another position;

FIG. 12 is a detail view of a part illustrated in FIG. 11 on an enlarged scale;

FIG. 13 is a front end view of parts illustrated in FIG. 8 with parts removed for clarity;

FIG. 14 is a detail view illustrating a base plate and parts carried thereby;

FIG. 15 is a view taken on the line 15—15 of FIG. 14;

FIG. 16 is a detail view of a part of the invention;

FIG. 17 is a view taken on the line 17—17 of FIG. 16;

FIG. 18 is a detail view illustrating a shuttle plate of the invention;

FIG. 19 is a detail view illustrating a brake element of the invention;

FIG. 20 is a detail view illustrating a fixed plate of the invention; and

FIG. 21 is a detail view illustrating a part of the invention.

Like parts are indicated by like numerals throughout the specification and drawings.

DESCRIPTION OF THE PREFERRED EMBODIMENT

Referring now to the drawings, and particularly to FIG. 1, the numeral 1 generally designates a host record player. The tape record player 1 is more fully described in copending application, Ser. No. 640,524, filed May 23, 1967, entitled "Record Player." It will be understood, however, that the host player 1 may take a variety of forms without departing from the nature and scope of the invention. The player 1, however, does have a playing head 1a and a receiver housing 2 formed and adapted to receive a tape cartridge of the eight-track or four-track type (not shown). The player 1 includes a capstan 3 driven through flywheel 4 by drive belt 5. A retention roller 6 is yieldingly urged toward engagement with a configuration in the side of a tape cartridge inserted in the pocket or receiver housing 2. As shown, the record player 1 includes a larger roller 7 in axial alignment with and rotatable with the roller 6.

In FIG. 1 the receiver housing or pocket 2 is shown as having received therein the converter cartridge 10 of the invention within which a cassette 11 is positioned. The cassette 11 has apertures 12,13 spaced therethrough for reception of driving spindles, it being understood that tape-carrying reels are rotatably positioned within the cassette 11 with their axes in axial alignment with the apertures 12,13 and with suitable teeth configurations (not shown) extending radially into apertures 12,13. An aperture 14 extends through cassette 11 for positioning therein a capstan.

As may be best seen in FIG. 2, the converter cartridge 10 includes a top wall 15 broken to provide for reception of cassette 11, the side walls 16,17 being recessed as shown for reception of a cassette, the upper surface of the cassette being in substantial alignment with the upper surface of top wall 15, the recesses in side walls 16,17 including a forward, downwardly inclined enlargement 18 to permit angular insertion of the forward edge of cassette 11. The side walls 16,17 are inwardly recessed to engage the forward corners of cassette 11, as indicated at 19. Supported beneath the cartridge 10 is a cam follower 20. In the outer end wall 21 of cartridge 10 are the control means shown as manually operable buttons 22,23.

Referring now to FIG. 4, it will be observed that a tape playing-recording head 30 is connected by suitable conductors to an amplifier 31 which is in turn connected to a magnetic field generator 32. A microphone 33 is connected by suitable conductors to a recording amplifier 34 to which eraser head 35 is also connected. A battery structure 36 is connected by a suitable conductor to switch contact 41 carried at the forward edge of a movable main arm 40 for contact with a switch contact 42 connected to amplifier 31.

Referring to FIGS. 4 and 5, it will be observed that the cam follower 20 includes a fixed arm portion 45 pivotally connected as at 46 to a forward portion of main arm 40, the cam follower 20 being positioned for actuation by enlarged roller 7. It will be understood, however, that a suitably configured and positioned cam follower will be provided for actuation upon contact with a suitable camming or retention element carried by the host record player with which the converter cartridge 10 is to be employed. For example, a suitably configured and positioned cam follower could be substituted for the follower 20 and positioned for engagement with a smaller roller such as roller 6, if desired, without departing from the nature and scope of the invention. Similarly, a suitably positioned element may be arranged for manual operation to move arm 40 when cartridge 10 is provided with self-contained power means.

The arm 40 has a lost-motion connection created by the slot 47 and the pin 48 carried by a sub-arm 49 and extending through slot 47. Arms 40,49 are yieldingly urged in opposite, overlapping directions by spring 50 connected at its opposite ends to the arms 40,49.

Illustrated in FIGS. 4 and 5 are pay-out spindle 51 and take-up spindle 52. The spindles 51,52 include enlarged circular base portions 51a,52a having frictional, circumferential wall surfaces or tires thereon. Each of the spindles 51,52 includes an upstanding post slidably carrying a toothed element for engagement with correspondingly toothed portions of the reels (not shown) within the cassette 11. As may be best seen in FIG. 7, the toothed portions 51b,52b are yieldingly urged upwardly on their respective center posts whereby insertion of the cassette 11 downwardly thereupon is permitted. Should the teeth of elements 51b, 52b be misaligned with respect to the teeth on the reels in cassette 11, the elements 51b,52b will, upon rotation, become aligned and will move upwardly for engagement with the cassette reel teeth.

A first pinch roller 60 is carried adjacent the forward portion of converter cartridge 10, a forward wall portion of which is removed to expose the circumferential wall of roller 60 for driving contact with a capstan, such as that shown at 3, of the host record player. Suitable drive means, such as the continuous belt 61, engage pinch roller 60 and a converter capstan 62 with which flywheel 63 is rotatable. Intermediate its opposite end turns the belt 61 drivingly engages a drive wheel 64.

A drive wheel for take-up spindle 52 is indicated at 65 and is carried on an arm 66 pivoted as at 67 and yieldingly urged as by spring 68 in a direction effective to move drive wheel 65 into contact with take-up spindle base 52a, as may be best seen in FIG. 9. The drive wheel 65 is mounted for rotation with a shaft 70 on arm 66, the lower end of which carries a corresponding wheel 71 positioned for engagement with wheel 64 when wheel 65 engages spindle 52.

As may be best seen in FIGS. 4 and 5, a second pinch roller 75 is carried by cartridge 10 on a bracket 76 pivoted on and beneath a portion 15a of the upper wall 15 of cartridge 10. The bracket 76 is pivoted at one of its ends as at 77 and pivotally carries at its opposite end a rod 78. A spring 79 serves to urge in opposite directions the bracket 76 and a slide piece 80 which slidably receives the rod 78. It will be observed that pinch roller 75 is positioned for movement with bracket 76 toward and away from capstan 62.

Referring now to FIG. 6, a fixed plate 90 is carried by cartridge 10 and is illustrated in detail in FIG. 20. The plate 90 has a forwardly extending ear 91 to which spring 92 is secured, the opposite end of spring 92 being secured to a brake member 93, the brake member 93 being shown in detail in FIG. 19. Brake member 93 is mounted for limited slidable movement beneath fixed plate 90 and has a centrally positioned slot 94 positioned therein for passage therethrough of pin 48 on arm 49. A straight wire spring element 95 extends perpendicularly across a rear portion of slot 94 for contact by pin 48 as illustrated in FIG. 8. Brake plate 93 carries, at its opposite ends, brake shoes 96,97 for simultaneous, frictional braking contact with the circumferential frictional surfaces of enlarged spindle base portions 51a,52a, respectively.

As may be best seen in FIGS. 7 and 10, a bracket 100 is pivotally carried intermediate its ends on a shaft 101. At one end of bracket 100 a first idler wheel 102 is rotatably mounted. At the opposite end of bracket 100 a second idler 103 is mounted in rotatable contact with idler 102.

Indicated at 104 is an upstanding, fixed guide pin for engagement with a suitable socket in a surface of cassette 11.

A shuttle plate 110 has its side edges slidably mounted in cartridge 10, as indicated at 110a in FIG. 13, and has a slotted forward central extension 111 guided by posts 112 on opposite sides thereof.

A first camming aperture configuration 113 is formed in plate 110 for engagement with a cam follower pin 114 carried at the distal end of arm 66. The cam configuration 113 includes an inclined elongated camming surface 115 at the forward end of which the pocket 116 is positioned for reception of pin 114. As may be best seen perhaps in FIG. 6, the pocket 116 extends toward the center line of plate 110 whereby reception of pin 114 therein tends to resist forward movement of plate 110.

Referring now to FIG. 14, a main plate 120 is shown therein, the plate 120 being configured for fixed attachment to cartridge 10 intermediate its top and bottom walls. Plate 120 carries rotatably thereon the spindles 51,52 and the bracket shaft 101, as well as the fixed guide post 112 and pin 104. An aperture 121 is provided for passage therethrough of pin 70 carrying wheel 65 above plate 120 and wheel 71 beneath plate 120. A second aperture 122 is provided for passage therethrough of pin 114. A generally centrally positioned aperture 123 is provided for passage therethrough of a shaft 130, which extends through arm 100 and rotatably carries idler 102. A slot 131 extends forwardly from aperture 123 for passage therethrough of pin 48. Struck upwardly from a forward portion of plate 120 are spaced, T-shaped guide-abutments 132. As may be best seen in FIG. 15, the abutments 132 are positioned for penetration of forwardly open slots 93a formed in member 93, the relationship thereof being illustrated in FIGS. 6 and 8, for example.

Main plate 120 has formed centrally on its rear edge a pair of spaced rearward extensions 135. The extensions 135 define therebetween an inwardly extending slot 136. The rearmost edges of extensions 135 include concave recesses 137. Secured to and extending rearwardly from the opposite rear corners of plate 120 is a first pair of control mounting rods 138 and a second pair of control mounting rods 139.

Referring now to FIGS. 16 and 17, the arm 49 includes the catch 140 for connection with spring 50. Spaced from the catch 140, beyond pin 48, is a fastener 141 mounting a pair of forwardly extending spring fingers indicated at 142,143. The distal or rear end of arm 49 carries upstanding thereon a cam-following roller 145 mounted for rotation on upstanding shaft 146. Secured also to the distal end portion of arm 49, and positioned just forwardly of shaft 146, is a yoke member 147. The member 147 has a central mounting plate portion 148 secured to the upper surface of the distal portion of arm 49 and oppositely extending, fixed yoke arms 149,150. The arms 149,150 extend oppositely in forwardly inclined planes from a rearward portion of member 147 and include reverse angle end portions 149a,150a, respectively. The distal end or rear portion of arm 49 includes downwardly depending shafts 151,152 positioned on opposite sides of and forwardly of shaft 146.

A first control link 155 has its inner end pivoted on shaft 151 and extends laterally therefrom in relation to arm 49. Intermediate its ends the link 155 has pivotally connected thereto, as at 156, a link element 157. The link element 157 extends forwardly toward a fixed post to which its forward end is pivoted as indicated at 158.

A second control link arm 160 has its inner end pivoted on shaft 152 and extends laterally from arm 49 in a direction opposite that of arm 155. Arm 160 has pivoted intermediate its ends, as indicated at 161, a forwardly extending link element 162, the forward end of which is pivoted to a fixed post as indicated at 163. Yielding means 164 engages the posts at 158,163 and link elements 157,162 to yieldingly urge said link elements toward each other and toward the center line of arm 49.

Referring now to FIG. 18, it will be observed that the shuttle plate 110 includes an aperture 170 through which fixed guide pin 104 may extend. The eraser head 35 and player head 30 are mounted by suitable brackets or fasteners on shuttle plate 110 for movement therewith. It will be observed that the head 30 is mounted on an angle bracket 30a which in turn is carried by a post structure 171 upstanding on plate 110. Reference is invited to FIGS. 4 and 5 wherein the piece 80 is shown in relation to bracket 76 and rod 78. It will be observed that the piece 80 is carried by post 171 on plate 110.

A camming configuration 172 is formed in a rear central segment of plate 110 for extension therethrough of shaft 146 and camming roller 145, the configuration 172 including a rear cross wall portion 173, a curved, conical, central, rearwardly extending forward portion 174 and concave forward segments 175 positioned on opposite sides and forwardly of the portion 174.

The control members illustrated herein as buttons 23,22 are mounted for slidable movement on rod sets 138,139, respectively. The buttons 23,22 include oppositely extending ears, indicated for example at 176 in FIG. 12, for contact with suitable sockets (not shown)

on the inner surface of a rear closure plate or wall 21 of cartridge 10 to retain the buttons 23,22 in the cartridge 10. Yielding means, such as those indicated at 177, surround each of the rods in the pairs 138,139 and urge buttons 23,22 in a direction outwardly from or to the rear of cartridge 10. The buttons 23,22 each rotatably carry a roller 178 having a portion extending forwardly of the button. As may be best seen in the undersurface view of button 22 in FIG. 12, each of the buttons has its lower wall recessed or cut away at one corner thereof, as indicated at 179, to expose a part of the roller 178 to the inner side of the button and to a depth rearwardly beyond the axis of roller 178 for purposes appearing hereinbelow.

Whereas there has been shown and described an operative form of the invention, it should be understood that this showing and description are to be taken in an illustrative or diagrammatic sense only. There are many modifications in and to the invention which will be apparent to those skilled in the art and which will fall within the scope and spirit of the invention. For example, while a cartridge 10 is shown as constructed for insertion into a record player having a pocket 2 and capstan 3, it will be understood that suitable driving mechanism for the roller 60 and a speaker for head 30 may be provided within the cartridge 10 for remote operation thereof. In such event, the cam follower 20 or similar mechanism effective to move arm 40 would be provided for manual or electrical operation to position the parts as described herein.

The use and operation of the invention are as follows:

Referring to FIG. 5, the parts are shown in an at-rest position. In such position, the cam follower 20 is so positioned as to hold arm 40, through the mediacy of arm 45, in its rearward position with relation to cartridge 10. In such position the pin 48 is urged rearwardly against spring 95, as shown in FIG. 8, and the brake shoes 96,97 are accordingly engaged, respectively, with spindles 51,52. Thus the reels within the cassette and the tape thereon are preserved against movement or mispositioning or creeping when the device of the invention is not in use.

A cassette is inserted by placing its forward edge within the opening formed in the upper wall 15 of cartridge 10 and inserting the cassette 11 at an angle corresponding substantially to that of the inclined edges of recesses 18 in the side walls of cartridge 10. This arrangement permits the insertion of cassette 11 in cartridge 10 without the necessity of exposing the entire opening in the upper wall 15 rearwardly of the pocket 2. With the forward edge of cassette 11 received in recesses 18, the rear end of cassette 11 is then lowered to drop the apertures 12,13 over the spindles 51,52 and to engage the toothed elements 51b,52b thereof with the teeth of the cassette reels extending into apertures 12,13. At the same time the cassette record-transporting capstan 62 penetrates aperture 14 in cassette 11 and the guide pin 104 seats within a suitable recess (not shown) in cassette 11.

With the cassette 11 thus in place, the cartridge 10 is moved inwardly within pocket 2 to move cam follower 20 from the position shown, for example, in FIG. 5 to the position shown in FIG. 4. It will be understood that the cartridge 10 may be provided with suitable means for manually operating a member such as follower 20 when the cartridge 10 is supplied with its own motive power for roller 60.

With the cam follower 20 in the position shown in FIG. 4, the arm 45 fixed thereon will have moved arm 40 forwardly within cartridge 10 and into the position illustrated in FIG. 4, thus bringing switch contacts 41,42 into engagement and supplying electrical energy from battery 36 to the electrical elements within the cartridge 10.

Forward movement of arm 40, through the mediacy of spring 50 and catch 140, is effective to move arm 49 forwardly within cartridge 10. Since the roller 145 is in engagement with central portion 174 of shuttle plate 110, it will be realized that forward movement of arm 49 is effective to move plate 110 forwardly within cartridge 10, roller 145 and shaft 146 moving in slot 136, and thus to position player-recorder head 30 and eraser head 35 for effective operation with the tape carried in cassette 11. Similarly, forward movement of plate 110, through the mediacy of post 171 and bracket 76, is effective to yieldingly urge the pinch roller 75 forwardly into cassette tape-transporting relationship with the cassette tape (not shown) and capstan 62.

It will be observed that drive roller 65 is disengaged from take-up spindle 52 when the parts are in the at-rest position shown in FIG. 5. Forward movement of shuttle plate 110, however, moves pin 114 out of pocket 116 and the inclined camming surface 115 of configuration 113 permits the spring 68 to urge arm 66 to the left, as the parts are shown in the drawings, to position drive wheel 65 in driving engagement with take-up spindle 52 and to engage intermediate wheel 71 with drive wheel 64.

It will be understood also that the insertion of converter cartridge 10 into pocket 2 to engage roller 7 with follower 20 and thus to position the parts as shown in FIG. 4, results also in the engagement of pinch roller 60 with the capstan 3 of the host player and thus, through the mediacy of continuous belt 61, to produce rotation of wheel 64, flywheel 63 and capstan 62. The rotation of capstan 62, with the pinch roller 75 in the position shown for example in FIG. 6, produces transport of the tape within the cassette 11, the take-up reel 52 being rotated at a predetermined speed sufficient to acquire the tape on the cassette reel (not shown) associated therewith.

It will be observed also that the forward movement of arm 40 resulting from insertion of the cartridge 10 in pocket 2 is effective to move pin 48 forwardly to disengage pin 48 from spring 95 and thus to release the brake shoes 96,97 from engagement with the spindles 51,52 and to free the latter for rotation.

Thus insertion of cartridge 10 in pocket 2 produces, substantially simultaneously, the release of brake shoes 96,97, the engagement of roller 60 with capstan 3 of the host player, the forward movement of pinch roller 75 and heads 30,35 into operative position and a driving connection between capstans 3 and 62, between wheels 64,71 and 65 and between wheel 65 and take-up spindle 52. The parts are thus automatically positioned in the playing-recording mode and the record within cassette 11 will play or record upon insertion of cartridge 10 fully into a host player. It will be understood that the host player is at that time suitably supplied with electrical energy and that head 30 reproduces sound from the cassette tape in known manner through amplifier 31, generator 32 and host player head 1a or records upon the cassette tape through use of heads 30,35, microphone 33 and recording amplifier 34 in known manner.

If the cartridge 10 be withdrawn from its forward, operating position in host player 1, the cam follower 20, arm 45 and arm 40 will be automatically moved into the position shown in FIG. 5. Retrograde movement of arm 40 produces, through pin 48, a corresponding rearward movement of arm 49. Engagement of roller 145 with cam surface 173 products a rearward movement of shuttle plate 110. With the rearward movement of arm 49, the pin 48 engages spring 95 to apply and retain the brake shoes 96,97 in engagement with spindles 51,52. Rearward movement of cartridge 10 separated roller 60 from capstan 3 to cease all driving action in cartridge 10 and cam surface 115 of plate 110 moved arm 66 to separate wheel 65 from spindle 52.

It will be understood that said action occurs upon retrograde movement of converter cartridge 10, whether the same be accomplished manually or by an ejection mechanism automatically effective upon cessation of a supply of electrical energy to the host player 1, such automatic ejection mechanism being shown, for example, in copending application, Ser. No. 640,524, filed May 23, 1967 and entitled "Record Player." In the case of a self-contained, remote cassette player-recorder structure, it will be understood that a suitable means for manually actuating arm 40 may be substituted for the automatic actuation thereof through cam 20 and roller 7, as above set forth, and an on-off power switch may be substituted for host capstan 3 to control driving action within cartridge 10.

With the shuttle plate 110 in its rearward position, the player head 30, eraser head 35 and pinch roller 75 are retracted and the cassette 11 may be lifted from the converter cartridge 10. Pin 114 will be seated in pocket 116 to hold plate 110 in its retracted position.

Should the operator desire to reverse the tape within the cassette while the same is in the playing-recording mode, it is only necessary that the operator take the single step of pressing inwardly the control means provided therefor. As shown, the control means includes a manually slidable button 23. As may be best seen in FIG. 8, initial inward movement of button 23 brings its roller 178 into contact with the outer portion of arm 155.

Because of the double pivot construction represented by arm 155, its pivotal connection to arm 49 at its inner end and its pivotal connection 156 to link element 157, the latter being pivoted as at 158 to a fixed post upstanding from the bottom wall of the cartridge 10, the initial inward motion of arm 155 produces a retrograde or rearward movement of arm 49 carrying with it the shuttle plate 110 to retract the pinch roller 75 and heads 30,35. Such rearward movement of arm 49, through the mediacy of pin 48 and spring 95, also applies the brake shoes 96,97 to spindles 51,52 as indicated in FIG. 8.

Continued inward motion of button 23, as may be best seen for example in FIG. 10, draws roller 145 away from cam surface 174 and into the left-hand receiving surface or pocket area 175, thus permitting a forward motion of arm 49 and producing a combined leftward tilting, as the parts are shown, and forward motion of arm 49, releasing pin 48 from spring 95 and thus releasing brake shoes 96,97 from spindles 51,52. At the same time the described motion of roller 145 does not result in forward motion of shuttle plate 110. In this regard the receiving recesses 137 in fixed main plate 120 correspond to and lie immediately beneath the cam pocket surfaces 175 of plate 110, thus preventing roller 145 from further forward motion and from having any forward-moving effect upon shuttle plate 110.

The tilting movement of arm 49 illustrated in FIG. 10 also produces a pivoting action of bracket 100 about its pivot 101 to bring idler 102 into operating engagement with spindle 51 and to bring idler 103, having a substantially smaller diameter than that of idler 102, into operating engagement with flywheel 63. Shaft 130 is urged toward spindle 51 by finger spring 143. The resulting rotation of spindle 51 in response to rotation of flywheel 63 and idlers 103,102 produces the rapid reversing transport of the tape within the cassette 11 onto the cassette supply reel (not shown) engaged with spindle 51.

Upon release of button 23 from the position shown in FIG. 10, the springs 177 return the button to its normal rearward position. The relatively powerful spring 164 returns the arm 49 to its untilted, linear alignment with arm 40, returning the roller 145 from surface 175 of plate 110 to surface 174 thereof.

The movement of roller 145 out of engagement with left-hand recess 137 and pocket 175 produces a momentary rearward movement of arm 49 and operation of the brake shoes 97,96 as a result of the actuation of spring 95 by pin 48. When roller 145 is again in alignment with the crest of surface 174, however, the slot 136 permits forward movement of the roller 145 with respect to main plate 120 and a consequent forward movement of the plate 110, pin 114 being forced out of pocket 116, again releasing the brake shoes 97,96, and repositioning the drive wheel 65 and heads 35,30 and pinch roller 75 in their operative positions. It will be understood that at substantially the moment roller 145 began its movement out of engagement with recesses 137,175 the idler rollers 103, 102 were disengaged from flywheel 63 and spindle 51, respectively.

Thus the playing-recording mode is reinstated promptly and automatically upon release of the button 23. Avoided is a series of individual controls requiring sequential operation to achieve interruption of the playing-recording mode, braking of the spindles, release of the braking action, creation of a rapid reversing action, release of said reversing action, reimposition of a brake condition, release of the brake condition and reinstatement of the playing-recording mode. All such steps are rapidly and smoothly accomplished in proper sequence as a result of a single inward linear motion of button 23 and release thereof.

The operator is thus enabled, by merely pressing button 23, to reverse the tape within the cassette for the purpose of replaying or recording upon a portion thereof at will. Should the operator find, upon the release of button 23 and substantially immediate reinstatement of the playing-recording mode that he has failed to reverse the tape within the cassette 11 a sufficient distance to reach the desired point thereon, it is only necessary that he again press button 23 for a period of time believed necessary to reach said point on the tape within the cassette 11.

Should the operator desire to lock the button 23 in its innermost position so as to continue an extended reversal of the tape within cassette 11 without manually holding button 23, he need only press the button 22 inwardly for a portion of its travel, as illustrated for example in FIGS. 10 and 11. It will be observed that the shunting of arm 49 and roller 145 to the left, as the parts are shown in the drawings, moves arm 160 into a position substantially perpendicularly related to the line of movement of button 22. Movement of button 22 into the position shown for example in FIG. 11 engages the distal end of arm 160 within the recess 179 formed in the bottom surface of button 22, the distal end of arm 160 thus engaging the roller 178 at a point rearwardly of its axis of rotation. Thus the arm 49 is locked in the position shown for example in FIG. 10. The operator may release manual pressure from button 22 and it will remain in the locked position against the action of springs 177 associated therewith.

In this position it will be observed that the roller 178 engages the distal portion 150a of the yoke arm 150, thus limiting the inward movement of button 22. As may be best seen at 180 in FIG. 11, contact of the roller 178 with portion 150a of arm 150 produced a slight movement of arm 49 toward its center line position, roller 145 being moved only a slight distance along the surfaces 137,175 toward cam surface 174. Said movement produced a right-hand movement of arm 160 to seat the distal end thereof within the recess 179 behind the axis of roller 178.

As may be best seen in FIG. 10, the distal end of arm 160 terminates at a point to the left of roller 178 when the arm 49 is in its furthermost left-hand position. Thus the locking engagement of arm 160 and button 22 is releasable upon only the slightest inward movement of button 23 by the operator. Said movement will return the arm 49 to its furthermost left-hand position as shown in FIG. 10 and will withdraw the distal end of arm 160 from the recess 179 and from engagement with the roller 178, thus permitting the springs 177 associated with button 22 to move said button outwardly.

It will be understood that a reverse of the foregoing description of the operation of button 23 is accomplished by inward linear movement of button 22. In response to engagement of the roller 178 on button 22 with the arm 160, the arm 49 will be swung to the right. Roller 145, arm 49 and plate 110 will first be moved rearwardly in response to the double pivot construction of arm 160 as above described with respect to arm 155, and brake shoes 96,97 will be applied. As the roller 145 moves into the right-hand pockets 175,137, arm 49 will move forwardly, shoes 96,97 will be released and idler roller 102 will engage both the flywheel 63 and the spindle 52, the idler 102 being urged thereagainst through the mediacy of finger 142 and shaft 130. The retrograde movement of shuttle plate 110 will disengage pinch roller 75 and withdraw player heads 30 and 35. Said movement will also have disengaged drive roller 65 from spindle 52 and will have seated pin 114 in pocket 116 of plate 110 to hold plate 110 retracted when roller 145 again begins its movement back toward surface 174. Thereupon the cassette take-up reel (not shown) associated with spindle 52 will be rotated through the mediacy of flywheel 63 and roller 102 to advance the tape rapidly and smoothly within cassette 11.

Upon release of button 22, spring 164 will return arm 49 to its center position again momentarily applying the brakes through the mediacy of pin 48 and spring 95 and, upon alignment of roller 145 with slot 136, repositioning shuttle plate 110, pinch roller 75, and heads 30,35 into operative position and immediately reinstituting the playing-recording mode. Thus the operator, through a single linear movement of button 22, may advance the tape within cassette 11 to any desired position. Immediately upon release of the button 22 the playing-recording mode is recreated. If the operator has not advanced the tape to the desired point, it is only necessary that he again press button 22 for a length of time believed sufficient to reach said desired point.

Should the operator wish to leave the button 22 in its inward position to continue advancement of the tape without continuously holding button 22 inwardly, he merely advances button 23 partially inwardly to engage the distal end of arm 155 with the roller 178 carried by button 23. The button 23 is released by limited inward pressure on button 22 in the manner described above with respect to release of button 22 from its locking position.

Thus a single inward movement of button 22 produces a withdrawal of plate 110, pinch roller 75 and heads 30,35, disengagement of wheel 65 from spindle 52, a momentary operation and release of brakes 97,96 to stop the spindles 51,52, an engagement of idler roller 102 with flywheel 63 and spindle 52, resulting in a rapid, smooth, quiet advance of the tape within the cassette 11. Upon release of button 22 the parts are automatically returned in a sequence effective to disengage the roller 102 from flywheel 63 and spindle 52, apply and release the brakes 97,96, readvance plate 110 to position the elements 75,30,35 in their operative position, reengage drive wheel 65 with take-up spindle 52 and to reinstitute, substantially immediately upon release of button 22, the playing of or recording upon the tape record (not shown) within cassette 11.

Should the cartridge 10 be withdrawn, or ejected, by a mechanism responsive to loss of electrical energy supplied to host player 1, for example, the resulting motion of arm 40 will apply the brakes, through the mediacy of pin 48 and spring 95, and the loss of driving energy will stop the operation of the device even though the parts are in the reversing or advancing mode. Similarly, the rearward motion of arm 49 in response to such withdrawal or ejection will product a disengagement of arm 155 from button 23 or arm 160 from button 22 should either of said buttons be in locked position when such withdrawal or ejection occurs.

The embodiments of the invention in which an exclusive property or privilege is claimed are defined as follows:

1. A tape drive unit for a tape recorder comprising a takeup reel shaft, a friction disc operatively connected with a drive source normally for driving the shaft, a transmission roller operable to operatively connect the shaft with the drive source, thereby causing the shaft to be driven at a different number of revolutions from that provided by said friction disc, control means to disengage the friction disc from operative connection with the shaft and at the same time to engage the transmission roller respectively with the shaft, and reset means for resetting said control means.

2. A tape drive unit according to claim 1, further including another shaft in parallel relationship with and at a distance from the takeup reel, said another shaft being adapted to carry another reel, said transmission roller being positioned between said takeup reel and said another reel, rewind means for beginning said transmission roller into operative connection with said another shaft while said transmission roller is in operative connection with said drive source, and second reset means for resetting said rewind means.

3. A tape drive unit for a cassette type tape player comprising:
   first and second takeup shafts, the shafts being in parallel relationship with, and at a given spacing from one another, each shaft being adapted to carry a tape reel;

a drive source;

a rotatable coupler means operatively connected with said drive source normally for rotatably driving at least one of said shafts;

a transmission drive means positioned in proximity with said first and second shafts and being operable to engage the drive source with a selected one of the first and second shafts, thereby causing said selected shaft to be driven at a different number of revolutions from that provided by said rotatable coupler;

control means for disengaging the rotatable coupler from operative connection with either of said first or second shafts and to engage the transmission roller with a selected one of the first and second shafts; and reset means for resetting said control means whereby the transmission drive means disengages, and the rotatable coupler engages the appropriate shaft.

4. The tape drive unit of claim 3 wherein the transmission drive means comprises:

a first idler wheel;

bracket means for carrying said idler wheel, said bracket means being movably mounted to the player; and wherein the control means comprises:

means to move said bracket such that the first idler wheel couples rotational drive from the drive source to the first takeup shaft.

5. The tape drive unit of claim 4 wherein the transmission drive means further comprises:

a second idler wheel;

means to couple the second idler wheel to said bracket;

and wherein the control means further comprises:

means to move said bracket such that the first and second idler wheels cooperate to couple rotational drive from the drive source to the second takeup shaft.

6. A tape drive unit for a cassette type tape player comprising:

first and second takeup shafts, the shafts being in parallel relationship with, and at a given spacing from one another, each shaft being adapted to carry a tape reel;

a drive source;

a rotatable coupler means operatively connected with said drive source normally for rotatably driving at least one of said shafts;

a transmission drive means positioned in proximity with said first and second shafts and being operable to engage the drive source with a selected one of the first and second shafts, thereby causing said selected shaft to be driven at a different number of revolutions from that provided by said rotatable coupler;

a tape head;

tape head positioning means movably mounted in the chassis and operable in a first mode to locate the tape head to be in contacting engagement with a tape to be played and operable in a second mode to remove the tape head from contacting engagement with said tape; and control means for disengaging the rotatable coupler from operative connection with either of said first or second shafts and to engage the transmission roller with a selected one of the first and second shafts, said control means operating the tape head positioning means to its second mode.

7. The tape drive unit of claim 6 further comprising reset means for resetting said control means whereby the transmission drive means disengages, and the rotatable coupler engages the appropriate shaft, said reset means operating the tape head positioning means to its first mode.

8. A cassette player tape drive unit comprising:

a player chassis;

a source of rotatable drive;

a pair of spindles predeterminedly positioned on the chassis to engage the takeup reels of a cassette to be played;

normal play drive means operable to couple rotational drive from the source to one of the spindles for driving the same at a predetermined speed;

fast play drive means including an idler wheel mounted on a movable bracket, which bracket is movably mounted in the chassis in proximity with the spindles such that the bracket is adapted to be positioned into a location whereby the idler wheel couples rotational drive to one of said spindles for driving the same at a speed exceeding the predetermined speed established by the normal play drive means;

a manually actuable selector which is operable to a first mode;

control means responsive to activation of the selector to its first mode to sequentially:

(a) disengage the normal play drive means from coupling rotational drive to one of the spindles, (b) apply a momentary braking force to at least one of the spindles, and (c) thereafter move the bracket to couple increased speed rotational drive to one of the spindles through the idler wheel.

9. The cassette player of claim 8 wherein the manually actuable selector is operable to a second mode, and wherein the fast play drive means further comprises a second idler wheel mounted on the bracket and adapted to be positioned by the bracket into a location such that rotational drive from the source is coupled through cooperation between the first and second idler wheels to one of the spindles for driving the same at a speed exceeding that established by the normal play means; and control means responsive to activation of the selector in its second mode to sequentially:

(a) disengage the normal play drive means from coupling rotational drive to one of the spindles, (b) apply a momentary braking force to at least one of the spindles, and (c) thereafter move the bracket to couple increased speed rotational drive through both idler wheels to one of the spindles.

10. The cassette player of claim 8 further comprising reset means responsive to deactivation of the selector to sequentially:

(a) move the bracket to decouple said increased rotational drive to said spindle, (b) momentarily brake at least one spindle, and (c) re-engage the normal play means.

11. The cassette player of claim 9 further comprising reset means responsive to deactivation of the selector to sequentially:

(a) move the bracket to decouple increased rotational drive to said spindle, (b) momentarily brake at least one spindle, and
(c) re-engage the normal play means.

12. A cassette player tape drive unit comprising:
a player chassis;
a source of rotatable drive;
a pair of spindles predeterminedly positioned on the chassis to engage the takeup reels of a cassette to be played;
normal play drive means operable to couple rotational drive from the source to one of the spindles for driving the same at a predetermined speed;
fast play drive means including an idler wheel mounted on a movable bracket, which bracket is movably mounted in the chassis in proximity with the spindles such that the bracket is adapted to be positioned into a location whereby the idler wheel couples rotational drive to one of said spindles for driving the same at a speed exceeding the predetermined speed established by the normal play drive means;
a manually actuable selector which is operable to a first mode;
control means responsive to activation of the selector to its first mode to sequentially:
(a) move the bracket to decouple increased speed rotational drive from one of the spindles through the idler wheel;
(b) apply a momentary braking force to at least one of the spindles, and
(c) engage the normal play drive means to couple rotational drive to one of the spindles.

* * * * *

UNITED STATES PATENT AND TRADEMARK OFFICE
CERTIFICATE OF CORRECTION

PATENT NO. : 4,107,749
DATED : AUGUST 15, 1978
INVENTOR(S) : KENNETH B. HARPER

It is certified that error appears in the above-identified patent and that said Letters Patent are hereby corrected as shown below:

Following the line containing item [22] on the cover page of the patent please insert:

--Related U.S. Application Data [62] Division of Ser. No. 730,790, May 21, 1968, Pat. No. 3,531,127.--

In column 1 of the patent prior to the heading "SUMMARY OF THE INVENTION", please insert.

--This application is a divisional application of application Serial No. 730,790, filed May 21, 1968 now U.S. patent No. 3,531,127 and assigned to the common assignee.

Signed and Sealed this

Sixth Day of March 1979

[SEAL]

Attest:

RUTH C. MASON
Attesting Officer

DONALD W. BANNER
Commissioner of Patents and Trademarks

UNITED STATES PATENT AND TRADEMARK OFFICE
CERTIFICATE OF CORRECTION

PATENT NO. : 4,107,749
DATED : AUGUST 15, 1978
INVENTOR(S) : KENNETH B. HARPER

It is certified that error appears in the above-identified patent and that said Letters Patent are hereby corrected as shown below:

In claim 3, line 17 on column 13, please delete the word "roller", and insert the words "drive means".

In claim 6, line 68 on column 13, please delete the word "roller", and insert the words "drive means".

Signed and Sealed this

Twenty-fourth Day of July 1979

[SEAL]

Attest:

Attesting Officer

LUTRELLE F. PARKER
*Acting Commissioner of Patents and Trademarks*